(12) United States Patent
Liang

(10) Patent No.: US 12,497,107 B2
(45) Date of Patent: Dec. 16, 2025

(54) OFF-ROAD VEHICLE

(71) Applicant: Zhejiang CFMOTO Power Co., Ltd., Zhejiang (CN)

(72) Inventor: Jianwu Liang, Hangzhou (CN)

(73) Assignee: Zhejiang CFMoto Power Co., Ltd., Hangzhou (CN)

( * ) Notice: Subject to any disclaimer, the term of this patent is extended or adjusted under 35 U.S.C. 154(b) by 0 days.

(21) Appl. No.: 18/741,339

(22) Filed: Jun. 12, 2024

(65) Prior Publication Data

US 2025/0002088 A1 Jan. 2, 2025

(30) Foreign Application Priority Data

Jun. 29, 2023 (CN) .......................... 202310791721.8
Jun. 29, 2023 (CN) .......................... 202310797173.X

(51) Int. Cl.
*B62D 23/00* (2006.01)

(52) U.S. Cl.
CPC .................................. *B62D 23/005* (2013.01)

(58) Field of Classification Search
CPC ....................... B62D 23/005; B60R 2022/3402
See application file for complete search history.

(56) References Cited

U.S. PATENT DOCUMENTS

| | | | |
|---|---|---|---|
| 7,591,510 B1 * | 9/2009 | Giampavolo | B62B 3/1452 280/33.993 |
| 8,556,331 B2 * | 10/2013 | Tsumiyama | B60J 5/0487 296/146.5 |
| 8,640,814 B2 * | 2/2014 | Deckard | B60N 2/01 296/205 |
| 8,998,216 B2 * | 4/2015 | Maeda | B62D 21/183 280/5.511 |
| 9,132,801 B2 * | 9/2015 | Fukuhara | B60R 22/34 |
| 10,427,578 B2 * | 10/2019 | Deckard | B60J 5/0412 |
| 11,760,304 B2 * | 9/2023 | Hicke | B60R 22/4604 280/801.1 |
| 12,208,706 B2 * | 1/2025 | Fredrickson | B62D 21/183 |
| 2011/0115259 A1 * | 5/2011 | Mizuta | B62D 25/14 296/193.11 |
| 2011/0133438 A1 * | 6/2011 | Haines | B60R 9/048 280/769 |
| 2011/0148088 A1 * | 6/2011 | Arnold | B60N 2/36 296/64 |
| 2013/0009391 A1 * | 1/2013 | Miller | B60R 21/18 280/806 |
| 2014/0217715 A1 * | 8/2014 | Minami | B60N 2/688 280/807 |
| 2018/0186330 A1 * | 7/2018 | Tsumiyama | B60R 22/26 |
| 2019/0009823 A1 * | 1/2019 | Savard | B62D 23/005 |
| 2023/0392629 A1 * | 12/2023 | Zantos | F16B 7/0406 |

* cited by examiner

*Primary Examiner* — Paul N Dickson
*Assistant Examiner* — Shams Dhanani
(74) *Attorney, Agent, or Firm* — Shewchuk IP Services, LLC; Jeffrey D. Shewchuk

(57) ABSTRACT

An off-road vehicle includes a frame, a roll-over protection structure, a suspension, wheels and a payload area. The frame and the roll-over protection structure cooperatively define a cockpit area. The frame includes a plurality of side posts arranged at the two sides of the cockpit area, and a cross tube. The payload area may include front-row seats and rear-row seats or may include front-row seats and a cargo box. The off-road vehicle further includes a seat belt and a belt retractor for both a driver seat and a passenger seat, and the belt retractors are at least partially arranged on the cross tube.

20 Claims, 12 Drawing Sheets

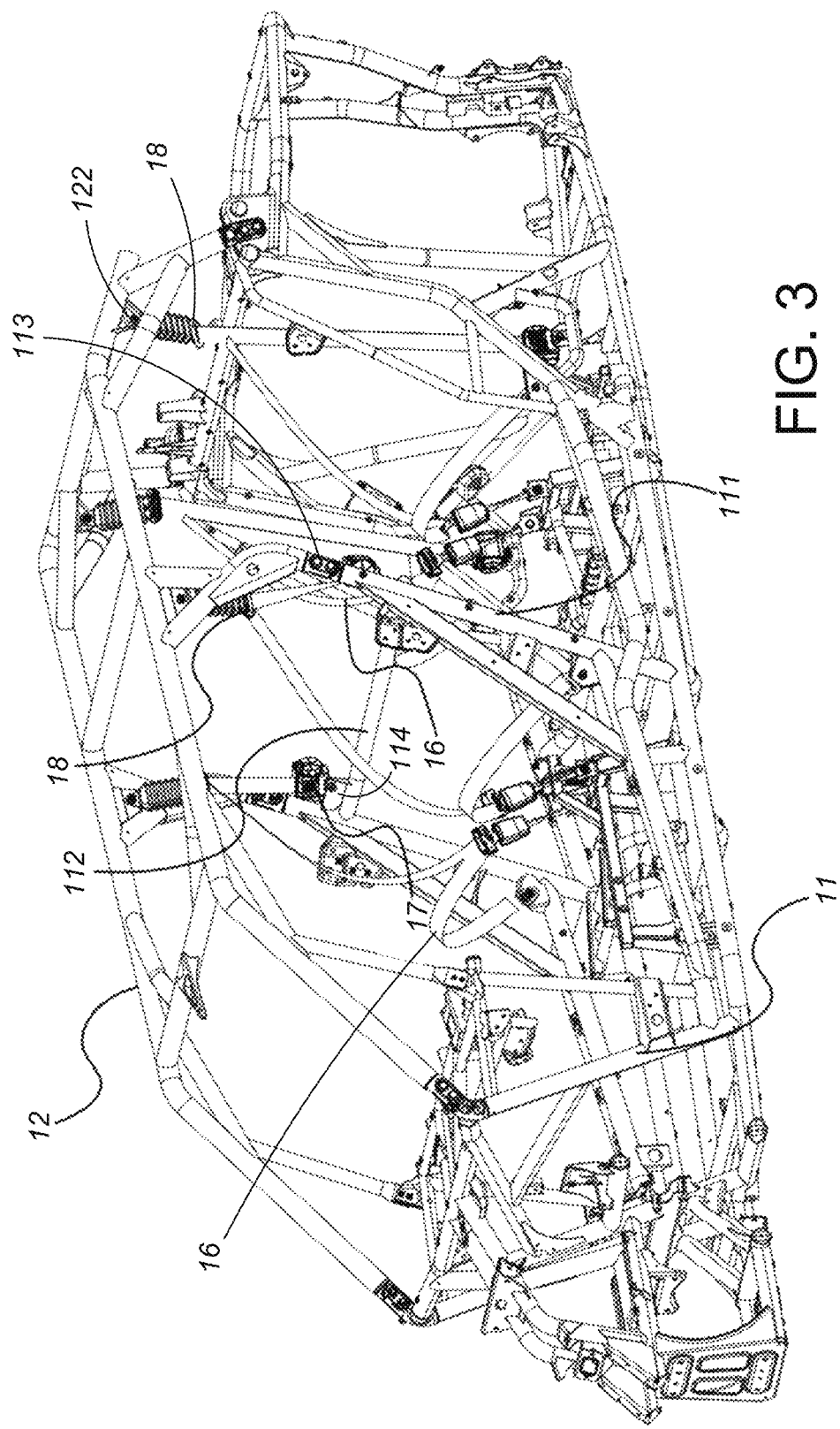

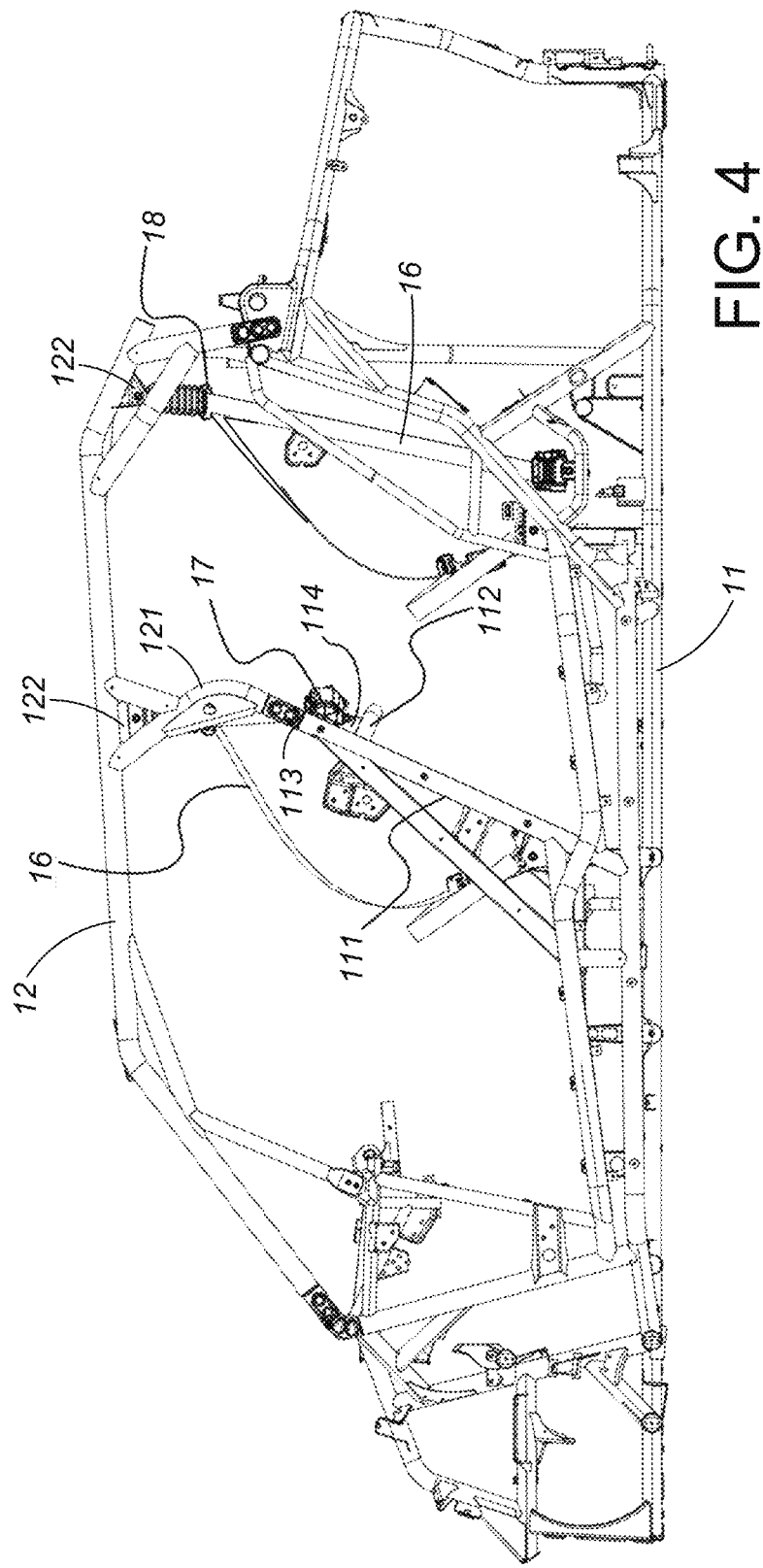

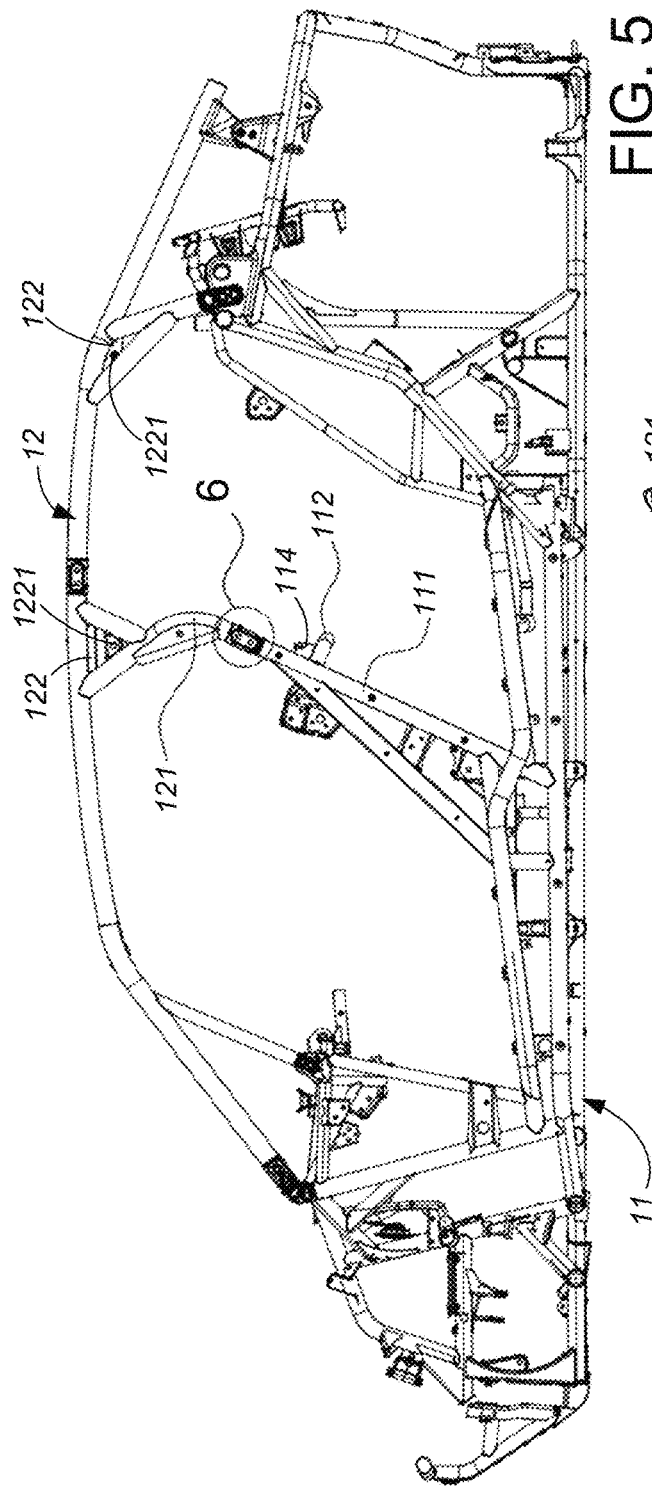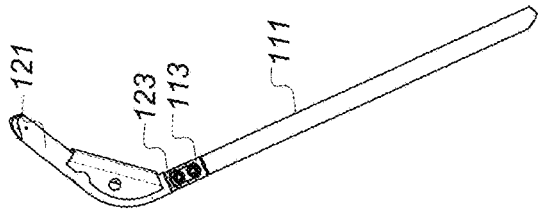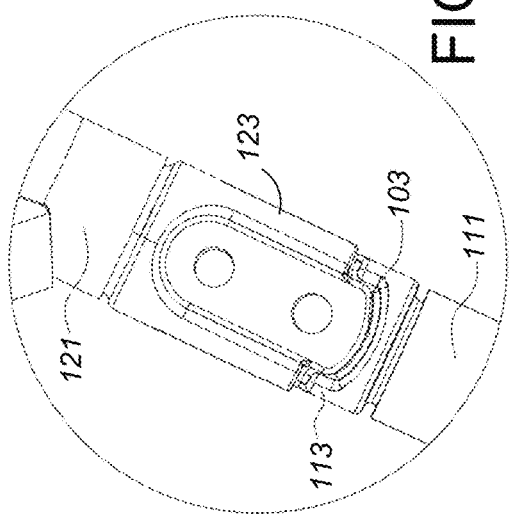

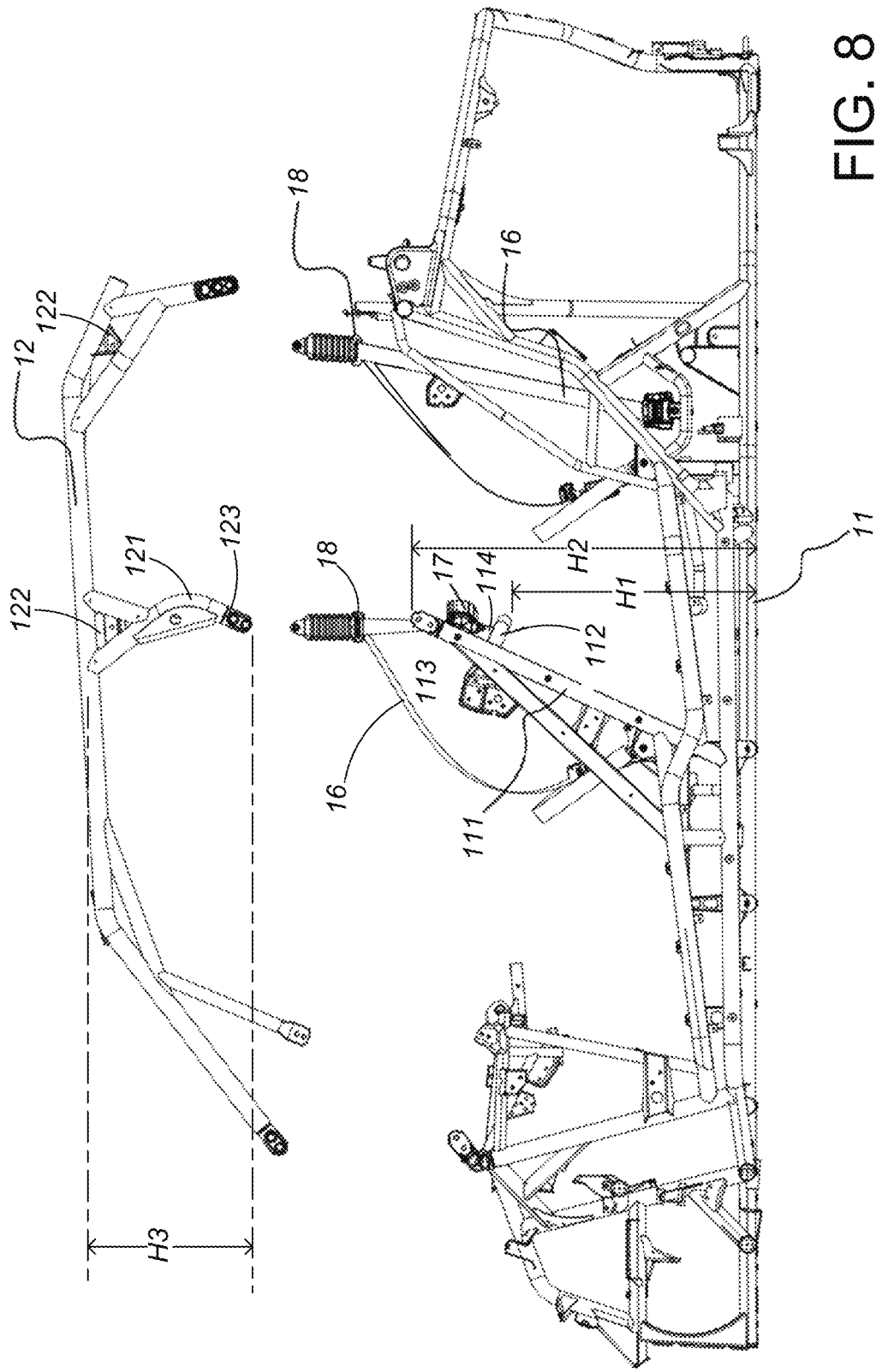

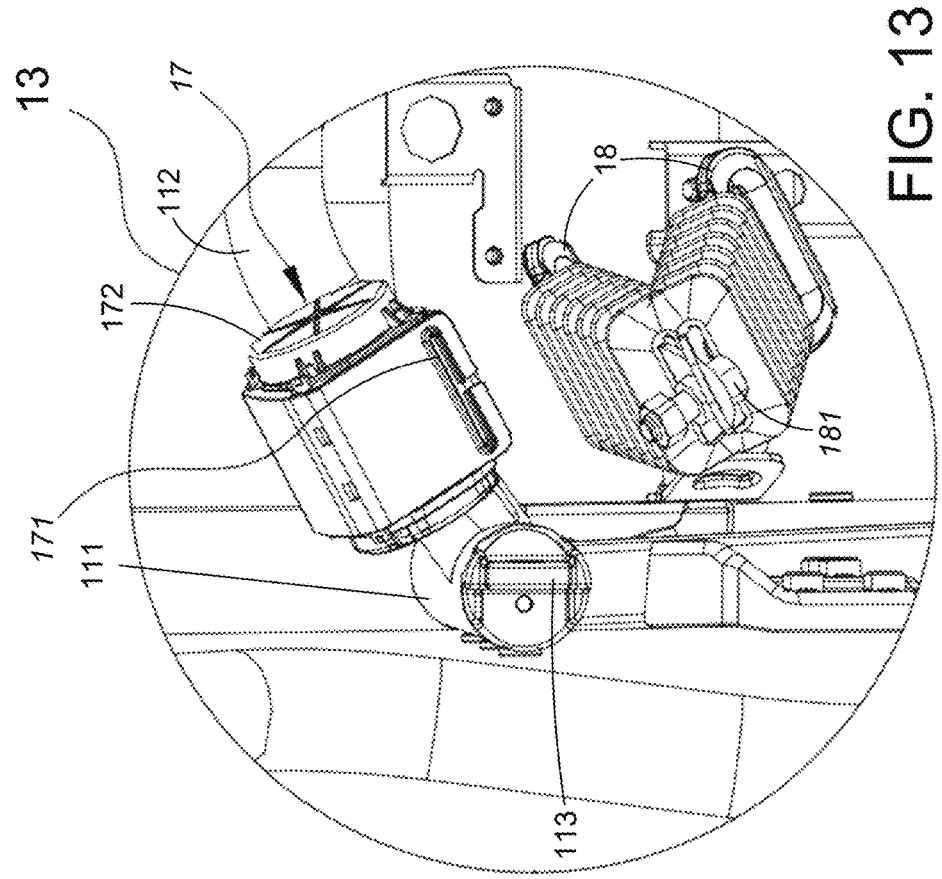
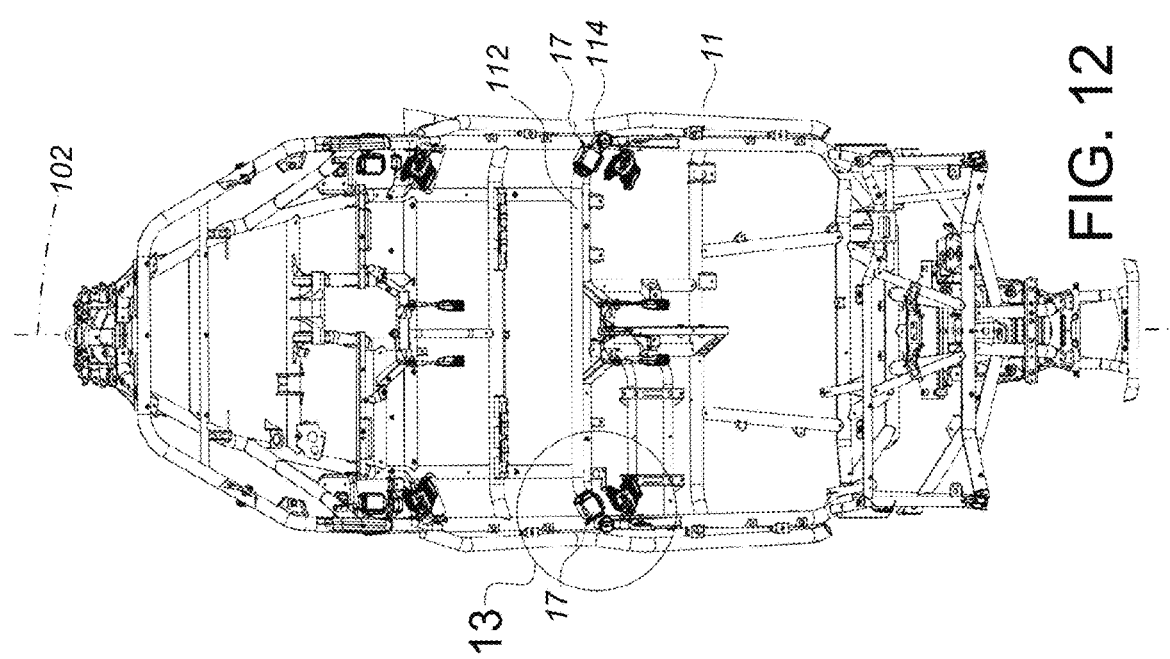
FIG. 13
FIG. 12

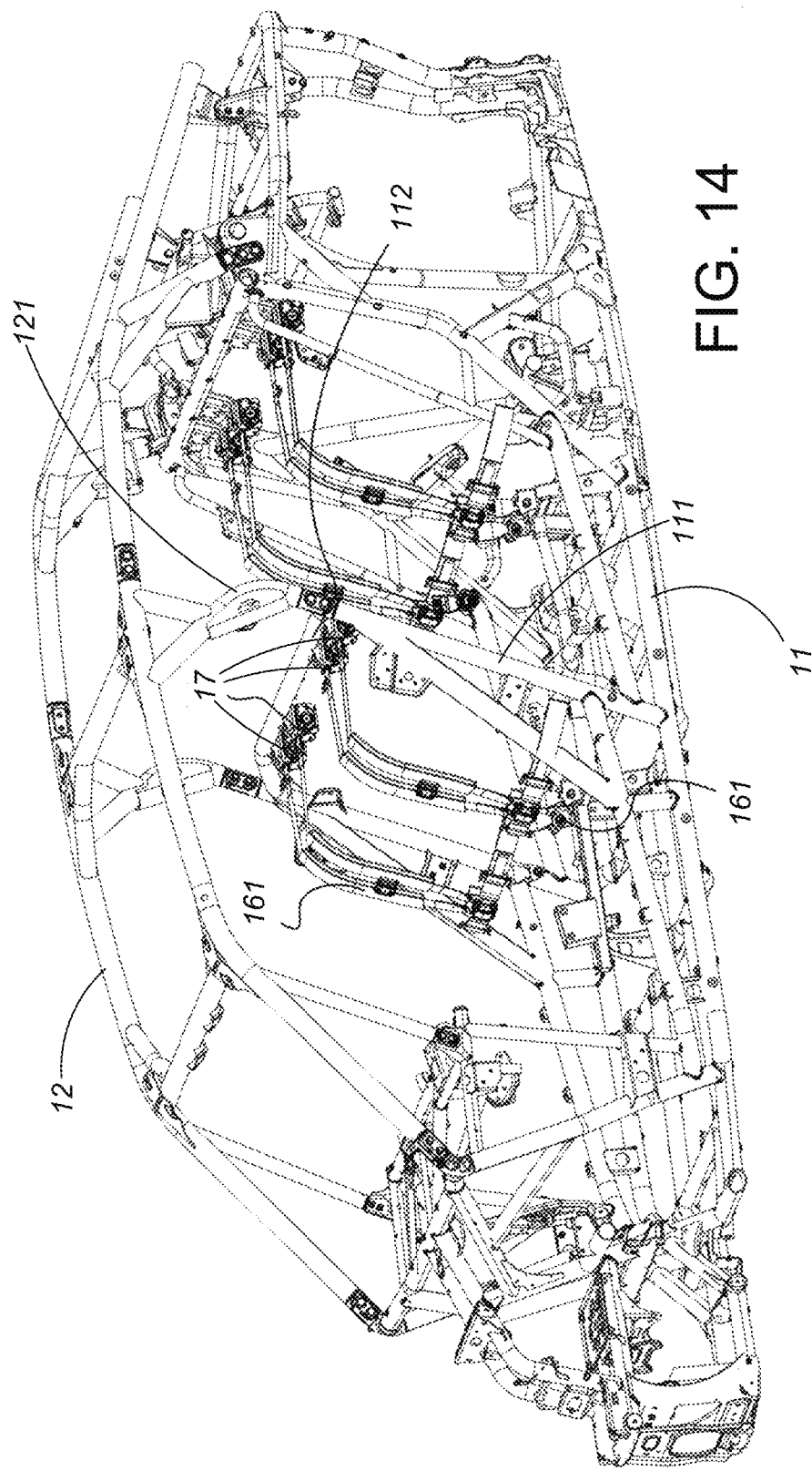

ions of priority to Chinese Patent Applications No. 202310791721.8, filed with the Chinese Patent Office on Jun. 29, 2023 and No. 202310797173. X, filed with the Chinese Patent Office on Jun. 29, 2023. The entire contents of the above-referenced applications are incorporated herein by reference.

OFF-ROAD VEHICLE

RELATED APPLICATION INFORMATION

The present application claims the benefits of priority to Chinese Patent Applications No. 202310791721.8, filed with the Chinese Patent Office on Jun. 29, 2023 and No. 202310797173. X, filed with the Chinese Patent Office on Jun. 29, 2023. The entire contents of the above-referenced applications are incorporated herein by reference.

FIELD OF THE DISCLOSURE

The disclosure relates to the field of vehicles, and particularly to an off-road vehicle.

BACKGROUND OF THE DISCLOSURE

Off-road vehicles, typically having four wheels, are characterized by having wide tires that can increase the contact area with the ground and can generate greater friction and reduce the pressure on the ground, as well as by having high suspension travel, making them easier to drive on various rugged terrains, such as beaches, river beds, forest roads, streams, and deserts. Off-road vehicles can carry personnel or transport goods to many unpaved locations.

One type of off-road vehicle is a side-by-side vehicle (SSV) that can simultaneously meet the requirements of carrying both people and goods. Compared to most all-terrain, straddle-type vehicles (ATVs), the size of most SSVs is relatively large. SSVs are commonly provided with safety belts and belt retractors in addition to a roll-over protection structure (ROPS) which surrounds the cockpit area to protect the driver and any passengers as the vehicle traverses over complex terrains and potentially steep trail conditions.

The installation location of the belt retractor for retracting the seat belt is very important. The belt retractor in the existing SSVs is generally arranged on the ROPS. However, arranging the belt retractor on the ROPS results in significant stability issues and safety risks for drivers and passengers because the ROPS may deform during a roll-over event, such as due to the connection strength between the frame and the ROPS being insufficient to handle roll over forces and stresses.

SUMMARY OF THE INVENTION

In this application, an off-road vehicle is provided to reduce the risk of seat belt and belt retractor failure.

The off-road vehicle includes a frame, a roll-over protection structure (ROPS), a suspension, a plurality of wheels and a payload area. The ROPS is arranged above the frame and is fixedly connected to the frame. The frame and the ROPS cooperatively define a cockpit area for accommodating a driver and any passengers. The suspension is connected to the frame. The wheels are connected to the frame by the suspension. The payload area either includes a plurality of front-row seats and one or a plurality of rear-row seats or includes a plurality of front-row seats and a cargo box. The front-row seating preferably includes a driver seat separate from a passenger seat. The frame includes a plurality of side posts and a cross tube. The side posts are positioned at the left and right sides of the cockpit area, in a front-rear direction either between the front-row seats and the rear-row seating or between the front-row seats and the cargo box. Ends of the cross tube are fixedly connected to the two side posts, with the cross tube extending laterally across the vehicle behind the front-row seats. The cross tube is at a height above the seating surface of the front-row seats. The off-road vehicle further includes a seat belt and a belt retractor for retracting the seat belt. The belt retractor is at least partially connected to the cross tube. Both the driver seat and the passenger seat are preferably provided with at least one belt retractor arranged at the side of the seat adjacent to the side post.

In another aspect, the ROPS includes an extension portion connecting to upper ends of the side posts. The height of the extension portion is defined as a ROPS height, the height of the side post is defined as a side post height, and a ratio of the ROPS height to the side post height is in the range from 0.4 to 0.65.

With the invention, the connection strength of the frame and the ROPS is improved, which in turn enhances the protective effect of the seat belt. The installation method of the belt retractor is easier. The location of the belt retractor ensures that the seat belt can be used normally.

BRIEF DESCRIPTION OF THE DRAWINGS

FIG. 3 is a left side front perspective view of the frame structure of FIG. 2 and ROPS of FIG. 1, and also showing the seat belts;

FIG. 4 is a left side view showing connection of the frame, ROPS and seat belts of FIG. 3 as used in the off-road vehicle of FIG. 1;

FIG. 5 is a left side view showing connection of the frame of FIG. 3 and an alternative ROPS;

FIG. 6 is an enlarged view of part 6 in FIG. 5;

FIG. 7 is a right (front the inside of the vehicle) side view of the left side post of the frame connected to the left extension portion of the ROPS;

FIG. 8 is an exploded view of the frame, ROPS and seat belts of FIGS. 3 and 4;

FIG. 12 is a top view of the frame structure of FIGS. 2-4, 6 and 8-10;

FIG. 13 is an enlarged view of part 13 in FIG. 12;

FIG. 14 is a left side perspective view of the frame and ROPS of FIGS. 2, 3, 8 and 10 showing alternative seat belts.

DETAILED DESCRIPTION

For a better understanding of the purpose, technical solutions and advantages of the present disclosure, preferred embodiments of the present disclosure are described and illustrated below.

As used in this specification, a component being arranged on another component may mean that the component being arranged on another component directly or the component being arranged on another component indirectly (for example, by an intermediate component). As used in this specification, the terms "connected to", "linked to" "coupled to" and the like are not limited to physical or mechanical connections, but may include electrical connections, whether directly or indirectly (for example, by an intermediate component). As used in this specification, the terms "vertical", "horizontal", "left", "right", and similar expressions are for illustrative purposes only and do not represent the only embodiment.

As used in this specification, the terms "first", "second", "third" and the like are only for distinguishing similar objects, and do not represent a specific order for the objects, and may explicitly or implicitly include at least one of these objects.

Figure 1:
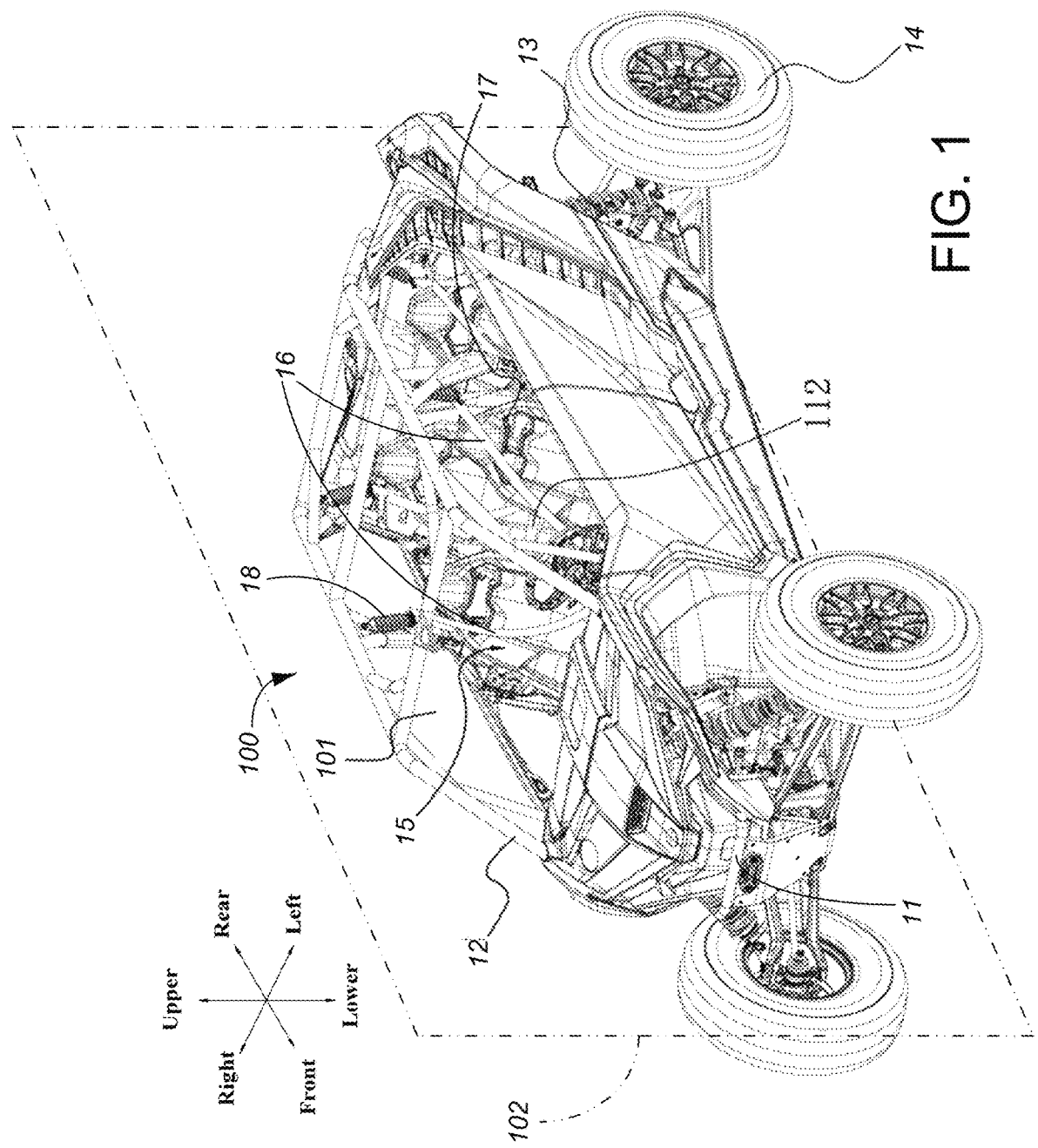
FIG. 1 is a front left perspective view of an off-road vehicle according to a first embodiment of the present invention.

As shown in FIG. 1, a first exemplary embodiment is provided. An off-road vehicle 100 includes a frame 11, a roll-over protection structure (ROPS) 12, a suspension 13, a plurality of wheels 14 and a payload area 15. The frame 11 forms the basic framework of the off-road vehicle 100, and may be formed from metal tubes which are bent and/or welded or otherwise joined together. A longitudinal mid-plane 102 is defined as a plane perpendicular to the ground and where the center line of the off-road vehicle 100 is located. The frame 11 may be substantially symmetrical respective to the longitudinal mid-plane 102. The ROPS 12 is fixedly connected to the frame 11 so as to be positioned above the frame 11. The ROPS 12 and the frame 11 cooperatively define a cockpit area 101 for accommodating a driver and possibly one or more passengers. The suspension 13 is connected to the frame 11, and the wheels 14 are connected to the frame 11 by the suspension 13. The payload area 15 is at least partially installed in the cockpit area 101 for a driver and passengers. The directions of front, rear, left, right, up (upper) and down (lower) are defined in FIG. 1 for clarity.

As shown in FIGS. 2-4, 6, 8 and 10, in the preferred embodiment, the frame 11 includes two side posts 111 extending backwards and substantially upwards from the bottom of frame 11. The side posts 111, also referred to as side beams 111, are arranged at left and right sides of the cockpit area 101, respectively. The preferred lean angle of the side posts 111 largely matches the angle that the seat backs of the front-row seats 151 lean upwardly and rearwardly. The side posts 111 arranged on two sides (left and right sides) of the frame 11 may be substantially symmetrical with respect to the longitudinal mid-plane 102.

The frame 11 further includes a cross tube 112 substantially extending in the left-right (transverse) direction. Two ends of the cross tube 112 are fixedly connected to the side posts 111 on the two sides respectively. The cross tube 112 improves the resistance to deformation of the frame 11 when dealing with impacts in both left and right directions.

Figure 2:
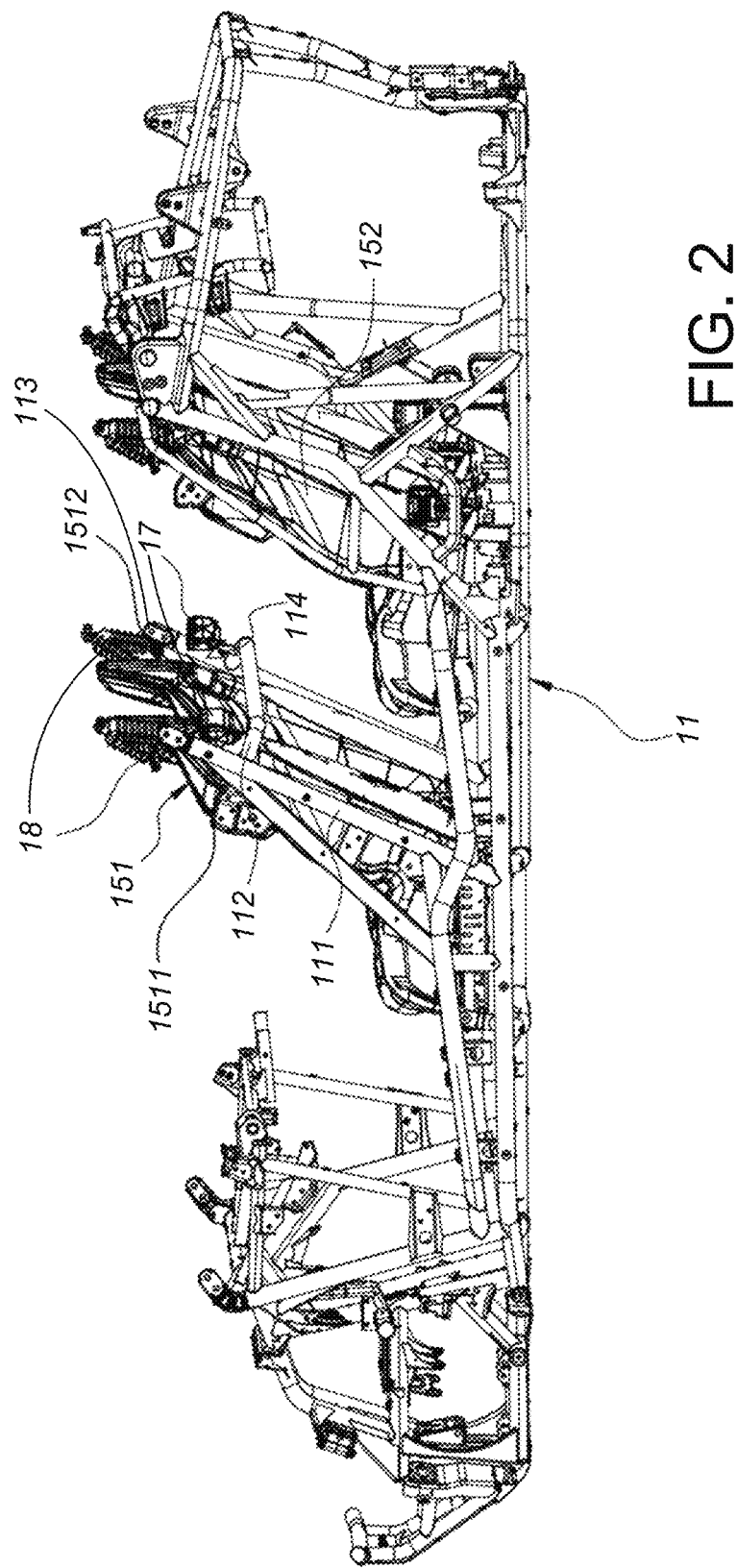
FIG. 2 is a left side perspective view of the frame structure and seating of the off-road vehicle in FIG. 1.

The payload area 15 includes front-row seating 151 and preferably one or a plurality of rear-row seats 152 as shown in FIGS. 1 and 2. The side beam 111 is at least partially between the front-row seats 151 and the rear-row seats 152 in side view of the off-road vehicle 100. The cross tube 112 is positioned behind the front-row seats 151 in the front-rear direction and crosses the cockpit area 101 in the left-right (transverse) direction. The cross tube 112 positioned behind the front-row seats 151 may also be grasped as a hand hold by passengers seated on the rear-row seats 152.

Figure 10:
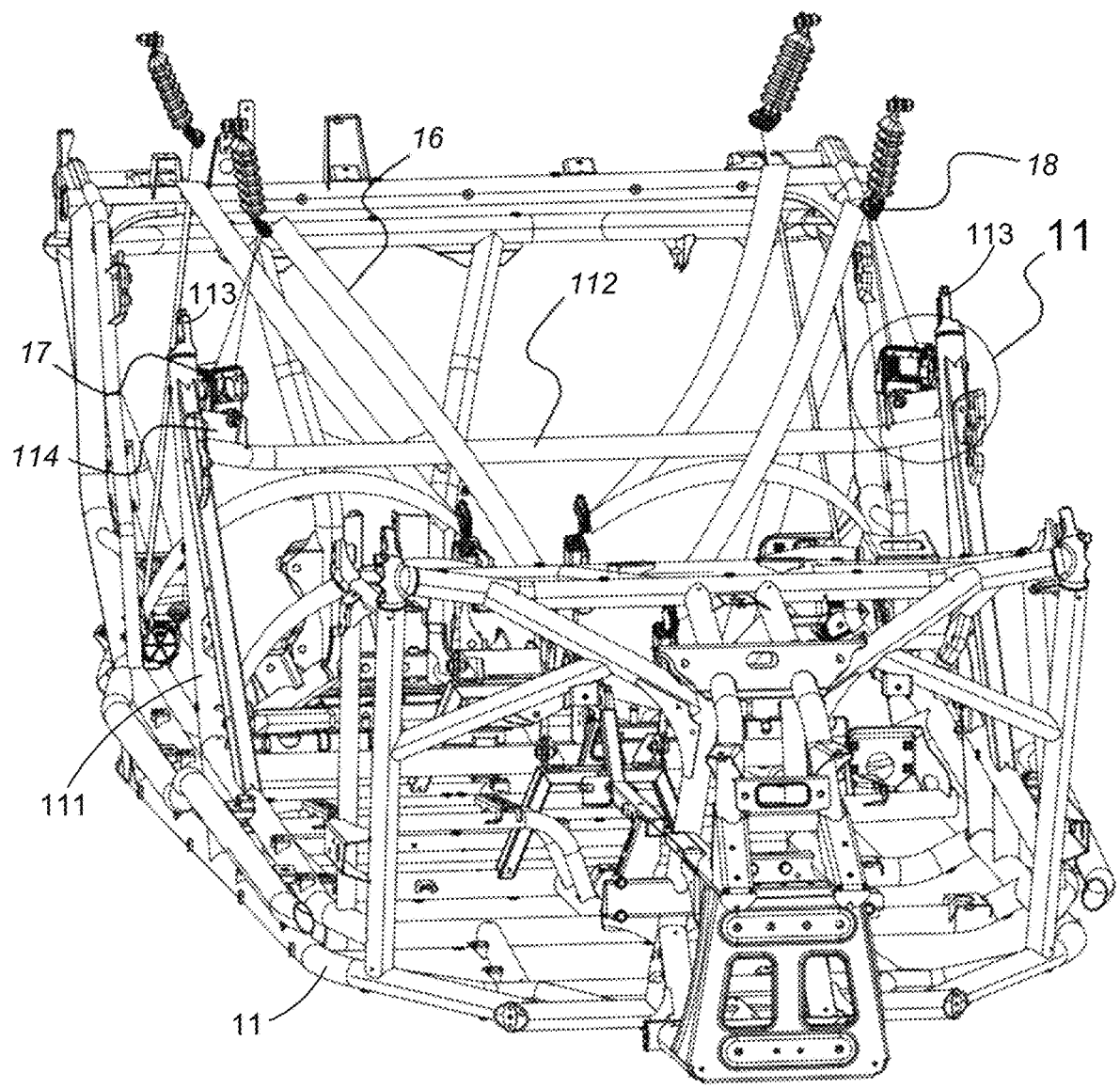
FIG. 10 is a front right perspective view showing the frame and seat belts of FIGS. 3, 4 and 8.

As best shown in FIGS. 3, 4 and 10, the off-road vehicle 100 further includes at least one seat belt 16 with a belt retractor 17 arranged on the frame 11. The seat belt 16 is wrapped inside the belt retractor 17, such as by a spring engagement sprocket mechanism 175 (shown in FIG. 11, wherein the wound seat belt inside the belt retractor 17 is not shown so the spring engagement sprocket mechanism 175 can be seen). The spring engagement sprocket mechanism 175 can unwind while the vehicle 100 is on flat ground and not significantly accelerating, but catches whenever the vehicle is quickly accelerating or decelerating such as during a crash event.

The front-row seats 151 preferably include a driver seat 1511 and a passenger seat 1512. Both the driver seat 1511 and the passenger seat 1512 are provided with at least one belt retractor 17 as a fixing point for seat belt 16. If both the driver seat 1511 and the passenger seat 1512 are provided with only one belt retractor 17, then the belt retractors 17 are arranged at the outer side and rear edge of each of the driver seat 1511 and the passenger seat 1512. This location locates the belt retractor 17 adjacent to the corresponding side beam 111. The driver seat 1511 and the passenger seat 1512 are preferably substantially symmetrical with respect to the longitudinal mid-plane 102, and the belt retractors on the driver seat 1511 and the passenger seat 1512 are preferably substantially symmetrical with respect to the longitudinal mid-plane 102.

The belt retractor 17 is at least partially connected to the cross tube 112. In existing off-road vehicles, the belt retractor is generally arranged on the ROPS, such as on a cross tube of the ROPS. However, the ROPS is more easily deformed by external forces than the frame, so prior art structures which arrange the belt retractor on the ROPS are more likely to result in belt retractor failure, which is not conducive to the protection of the driver and passengers. In contrast, the preferred embodiment of the present invention arranges the belt retractor 17 on the frame 11, which better ensures the normal operation of seat belt 16 and belt retractor 17, thereby improving the safety and reliability of off-road vehicle 100. In addition to being used for passengers on the rear-row seats 152 to grip, the cross tube 112 is also used for installing the belt retractors 17. Therefore, the position for arranging the cross tube 112 is very important for satisfying the joint purposes of providing a rear passenger hand hold and installing the belt retractors 17 at the desired location. The cross tube 112 is positioned lower than the tops of the front-row seatbacks. In addition, the position of the cross tube 112 may also affect the usage space of the rear-row seats 152 in the cockpit area 101.

Figure 9:
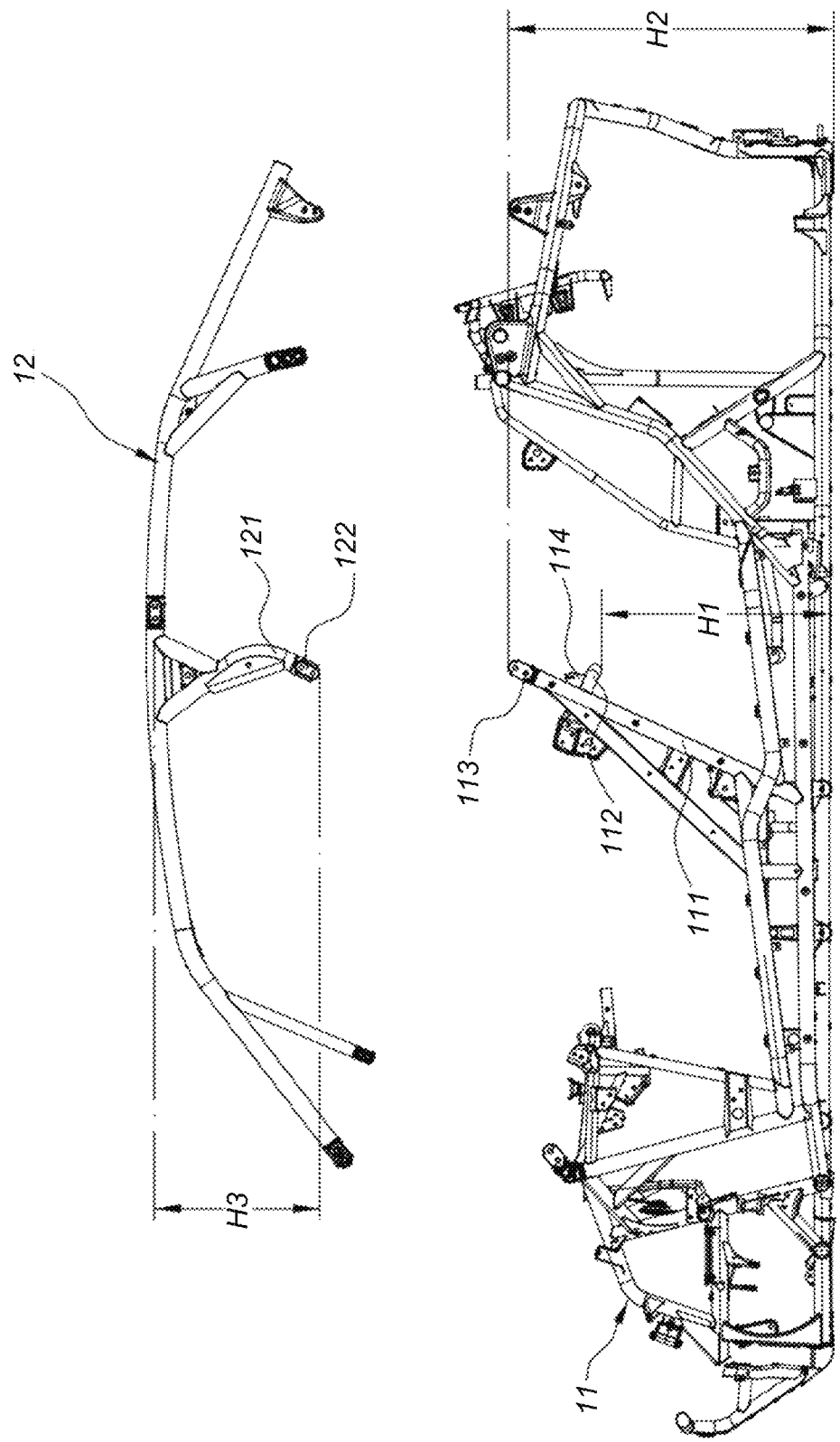
FIG. 9 is an exploded view of the frame and the ROPS of FIG. 6.

As called out in FIGS. 8 and 9, the height difference between the bottom of the cross tube 112 and the bottom of the frame 11 is defined as a cross tube height H1. A height difference between the top end of the side post 111 and the bottom of the frame 11 is defined as a side post height H2. In the preferred embodiment, a ratio of the cross tube height H1 to the side post height H2 is in the range from 0.65 to 1, more preferably in the range from 0.75 to 0.9, and most preferably has a value of 0.85. With a given side post height H2, if the ratio H1/H2 is too large, then the position of the cross tube 112 for arranging the belt retractor 17 is too high, and the seat belt 16 extended by the belt retractor 17 provides less effective safety protection for the driver and passengers. If the ratio H1/H2 is too small, then the position of the cross tube 112 is too low for passengers on the rear-row seats 152 to grip, which further reduces the space of the rear-row seats 152. Therefore, a reasonable range of ratios H1/H2 of the cross tube height H1 to the side post height H2 can optimize the layout of the belt retractor 17 while making it easier for passengers on the rear-row seats 152 to grasp the cross tube 112, thereby providing effective safety protection for all occupants.

The ROPS 12 can provide protection for the driver and passengers located inside the cockpit area 101, preventing the driver and passengers from contact with the ground and/or from being thrown out of the cockpit area 101. The ROPS 12 needs to be able to bear a significant shear force when impacted, and the strength of the ROPS 12 is therefore very important to the safety of the off-road vehicle 100.

As best shown in FIGS. 1, 3, 4, 6, 8 and 9, the ROPS 12 preferably includes two extension portions 121, one on each side of the ROPS 12. The ROPS 12 is fixedly connected to the side beam 111 by the extension portions 121, such that the extension portions 121 essentially occupy the location of a B-pillar on an automobile. Each extension portion 121 may be formed from tubular steel substantially identical to tubular steel construction of the frame 11. Alternatively, the extension portions 121 may each be a casting or a forgeable piece. The height of the extension portions 121 is defined as a ROPS height H3 as called out in FIGS. 8 and 9. In the preferred embodiment, a ratio of the ROPS height H3 to the side post height H2 is in the range from 0.4 to 0.65, more preferably in the range from 0.45 to 0.6, and most preferably has a value of 0.55. With a given side post height H2, if the ratio H3/H2 of the ROPS height H3 to the side post height H2 is too large, the extension portion 121 is prone to interference with frame 11, making it difficult to assemble the ROPS 12 with frame 11. If the ratio H3/H2 of the ROPS height H3 to the side post height H2 is too small, the overall strength and impact resistance of the off-road vehicle 100 is reduced, thereby making the off-road vehicle 100 more prone to deformation after rollover. A reasonable range of ratios H3/H2 of the ROPS height H3 to the side post height H2 can minimize deformation of the ROPS 12 in the event of an accident. The extension portions 121 of the present invention improve the overall strength of frame 11 and ROPS 12, ensuring the safety of off-road vehicle 100. In contrast, the cross tube in existing off-road vehicles may be arranged on the ROPS, so the height of the ROPS needs to be larger resulting in a weaker overall strength. At the same time, the preferred extension portions 121 avoid interference between the ROPS 12 and the connection brackets on the ends of the cross tube 112, thereby improving the assembly efficiency of the frame 11.

In the preferred embodiment, the extension portions 121 connect with the side beams 111 through a surface contact method best shown with respect to FIGS. 6, 7 and 13. The extension portion 121 is configured to have a first limiting portion 1211 for limiting the side beam 111, and the side beam 111 is configured to have a second limiting portion 113 for limiting the extension portion 121. The second limiting portion 113 has a structure that is substantially the same as the first limiting portion 123 to enable mutual embedding between the extension portion 121 and the side beam 111. When the ROPS 12 is fixedly connected to the side beam 111 by the extension portion 121, the bottom end of the extension portion 121 is at least partially embedded within the second limiting portion 113 on the top of the side beam 111, and the top of the side beam 111 is at least partially embedded within the first limit portion 123 on the bottom end of the extension portion 121. As best shown in FIG. 6, both the first limiting portion 123 and the second limiting portion 113 include a U-shape defining a recess. When connected, the first limiting portion 123 and the second limiting portion 113 mate together with the first limiting portion 123 extending into the recess defined by the U-shape of the second limiting portion 113 and the second limiting portion 113 extending into the recess defined by the U-shape of the first limiting portion 123. The U-shape defined recesses facilitate the positioning and connection between the first limiting portion 123 and second limiting portion 113, increase the contact area between the first limiting portion 123 and second limiting portion 113, and improve the connection effect between the first limiting portion 123 and second limiting portion 113. Optionally, the shapes of the first limit portion 123 and the second limit portion 113 may be rectangular grooves. The preferred connection between the ROPS 12 and the frame 11 enables the ROPS 12 to bear greater shear force and improves the overall shear resistance performance of the connected frame 11 and ROPS 12.

When the extension portion 121 is connected to the side beam 111, an air gap 103 is defined between the extension portion 121 and the side beam 111 as called out in FIG. 6. The air gap 103 is located at the bottom of each U-shape, and the air gap 103 partially separates the extension portion 121 from the side beam 111 in the vertical direction. When the frame 11 and the ROPS 12 are impacted, the air gap 103 allows some mutual compression between the frame 11 and the ROPS 12, thereby improving the impact resistance performance of the frame 11 and the ROPS 12. In addition, transmission of noise, vibration, and acoustic roughness between the frame 11 and the ROPS 12 are reduced by the air gap 103, thereby providing a better driving experience for drivers and passengers.

Figure 11:
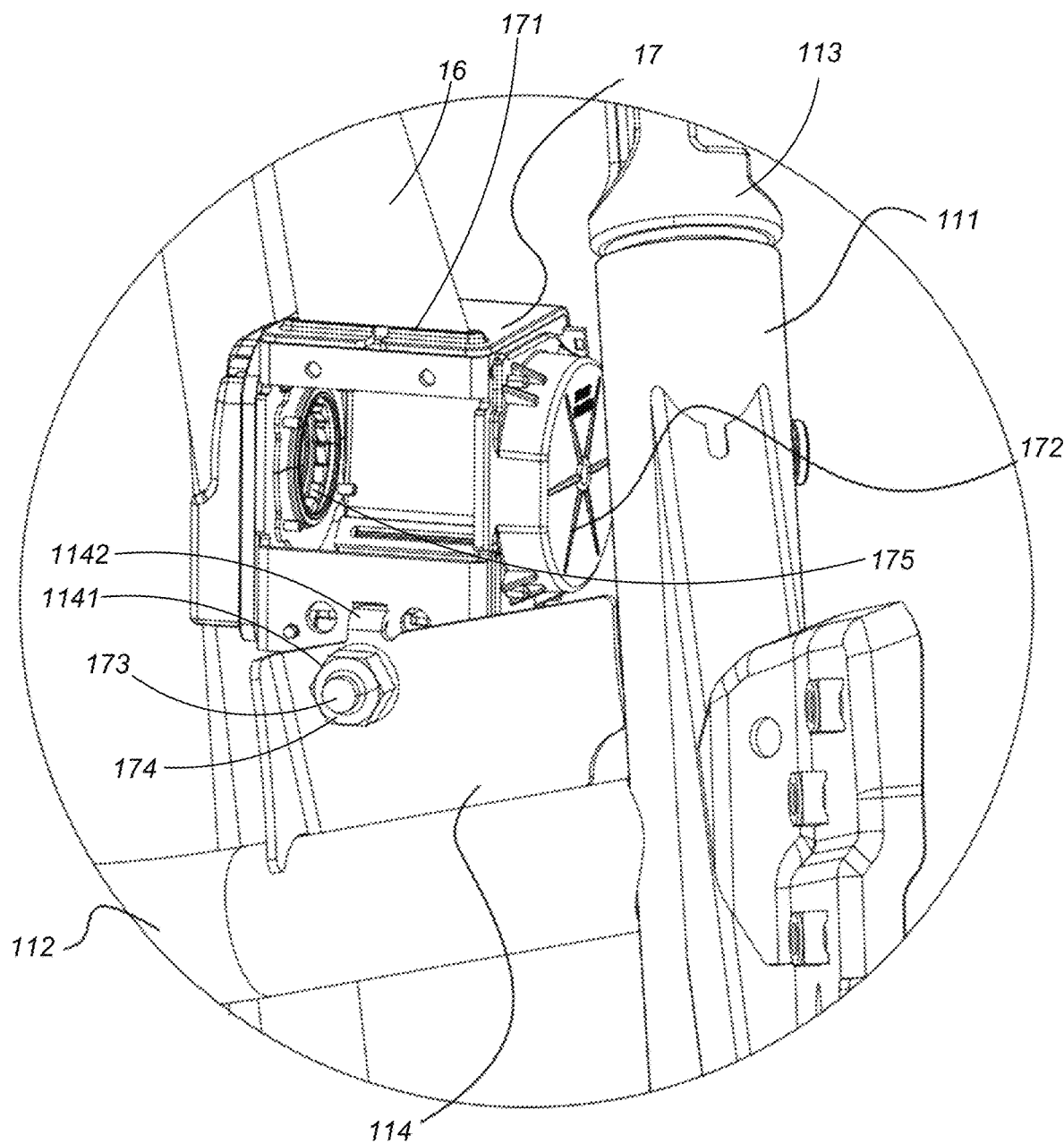
FIG. 11 is an enlarged view of part 10 in FIG. 9.

As best shown in FIG. 11, the frame 11 preferably includes a connection flange 114 fixedly connected to the cross tube 112. The belt retractor 17 is connected to the cross tube 112 by the connection flange 114. The stability of the connection between the belt retractor 17 and the cross tube 112 is increased by the connection flange 114. The connection flange 114 is made of sheet metal fixed on the cross tube 112 by means of welding, bolt fastening, clamping, or the like. The preferred connection flange 114 includes a bolt hole 1141 below a hook tab 1142, and a bolt 173 with a nut 174 used to secure the belt retractor 17 to the connection flange 114. The bolt hole 1141 is larger than the shaft diameter of the bolt 173, enabling play between the belt retractor 17 and the connection flange 114. The hook tab 1142 helps to support the belt retractor 17 to the connection flange 114 during assembly prior to tightening of the nut 174 to fix the belt retractor 17 at its desired elevation and tilt relative to the connection flange 114. The combination of the bolt hole 1141 and the hook tab 1142 enable both the installation angle and the installation height of the belt retractor 17 relative to the connection flange 114 to be adjusted before tightening of the nut 174. The installation angle and installation height of the belt retractor 17 can thus be adjusted appropriately by the connection flange 114, which is more suitable for the height of the front-row seats 1511, thereby making the seat belt 16 more comfortable.

The belt retractor 17 includes a protective cover 172 on one of its sides. The protective cover 172 helps prevent debris such as mud and sand from entering the interior of the belt retractor 17, thereby extending the service life of the belt retractor 17. The protective cover 172 can be removed to allow access to the interior of the belt retractor 17 for maintenance purposes.

As best shown in FIGS. 11 and 13, the belt retractor defines a mouth 171. The seat belt 16 is spring wrapped or wound inside the belt retractor 17 and is capable of extending outward from the mouth 171. The driver or passenger can pull the seat belt 16 outward from the mouth 171 to buckle the seat belt 16. The connection flange 114 and its attachment to the belt retractor 17 preferably orients the mouth 171 to face upwardly and forwardly.

A direction change device 18 is preferably used to change the direction of the seat belt 16 without adding excessive friction. The direction change device 18 is arranged above the mouth 171 of the belt retractor 17, such as by hanging the direction change device 18 from the ROPS 12. The preferred ROPS 12 includes a direction change hanger plate 122 for each of the direction change devices 18. The preferred direction change hanger plates 122 are adapted for hanging a direction change device 18, such as by having a through hole 1221 (called out in FIG. 6) used for hanging the direction change device 18, and then using a bolt 181 (called out in FIG. 13) or similar attachment method. Because the direction change device 18 are each hung from a direction change hanger plate 122, the direction change device 18 can swing to support the upper extent of the seat belt 16 in a range of hanging locations, and FIGS. 2, 12 and 13 show the direction change devices 18 in two different positions within this range of hanging locations, and without showing the seat belts 16.

The direction change device 18 can include a cylindrical component in contact with the seat belt 16 above the mouth 171. A user can pull the seat belt 16 forwardly and downwardly to extend and buckle the seat belt 16, with the direction change device 18 allowing this pull force to pull the seat belt 16 upwardly out of the mouth 171 of the belt retractor 17. The preferred seat belt layout including the direction change device 18 facilitates the flexible arrangement of the belt retractor 17 according to the shape and direction of the cross tube 112, thereby improving the retraction effect of the belt retractor 17.

The preferred embodiments of FIGS. 1-13 use a three-point seat belt 16, with two fixing points on the right and left sides of each seat 1511, 1512, 152 as well as a third fixing point provided by the belt retractor 17. However, multiple types of safety belts can use the belt retractor 17 arranged on the cross tube 114 in accordance with the present invention, making the invention generally applicable to a wide range of off-road vehicles. For instance, an alternative embodiment shown in FIG. 14 uses four-point seat belts 161. The four-point seat belts 161 each use two belt retractors 17 mounted on the bottom side of the cross tube 114 and oriented with their mouths 171 facing forwardly, omitting the direction change devices 18 and omitting the direction change hanger plates 122. The belt retractors 17 for the four-point seat belts 161 are preferably all located closer to the longitudinal mid-plane 102 than when positioned for the three-point seat belt 16. Similarly, the present invention can be applied to five point seat belts, which add an additional fixing point for seat belt centered in front of the seat.

Figure 15:
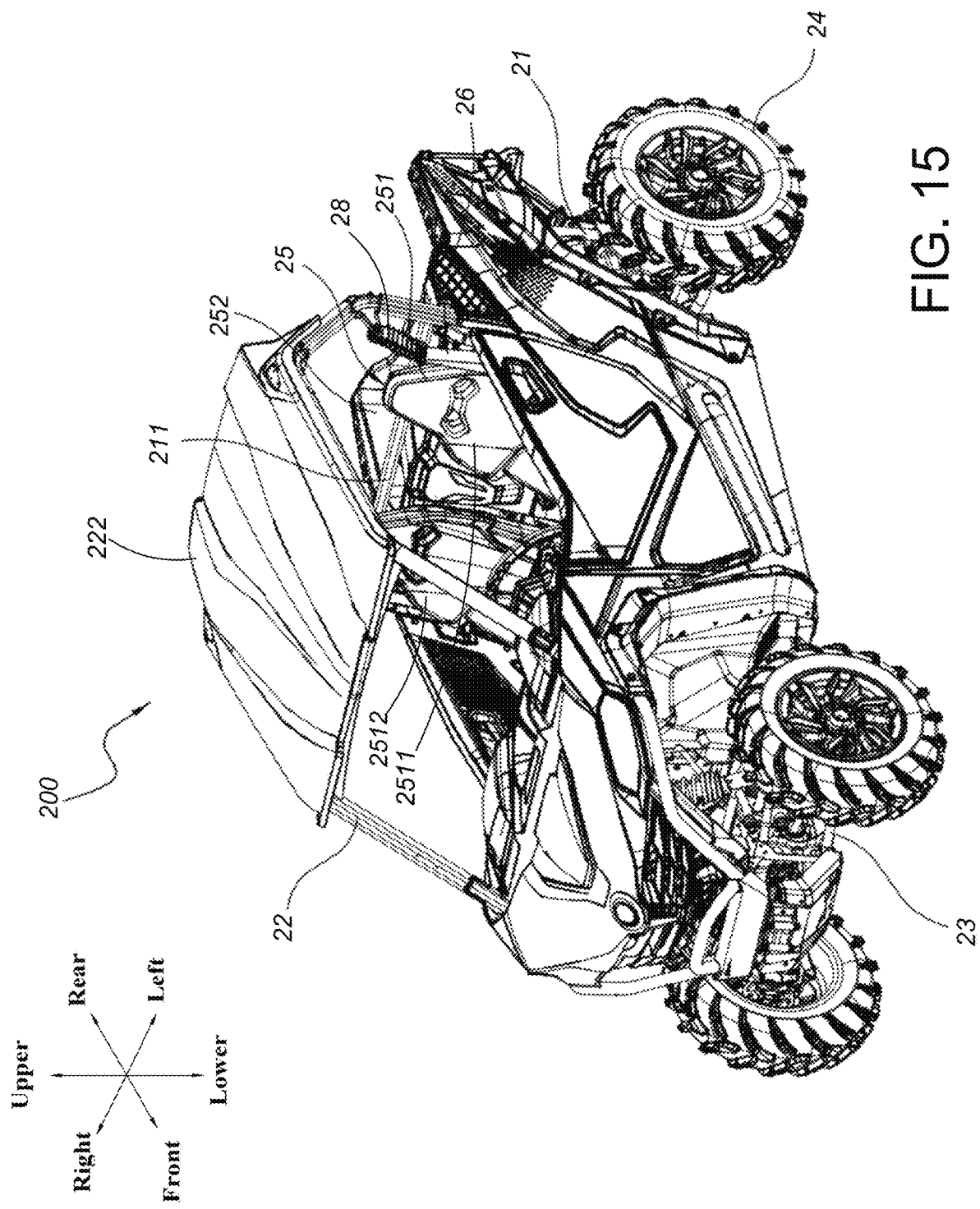
FIG. 15 is a front left perspective view of an off-road vehicle according to an embodiment of the present invention using a cargo area instead of rear seating.

An alternative off-road vehicle 200 is shown in FIG. 15. Like the first embodiment, the off-road vehicle 200 includes a frame 21, a ROPS 22, a suspension 23, and four wheels 24 that are substantially the same in principle as those in the off-road vehicle 100. In this case, the ROPS 22 supports a roof 222. The directions of front, rear, left, right, up and down are also defined in FIG. 15 for clarity.

The difference between the off-road vehicle 200 and the off-road vehicle 100 is that the payload area 25 of the off-road vehicle 200 includes a plurality of front-row seats 251 and a cargo box 252, i.e., the cargo box 252 replaces the rear seating 152. The frame 21 includes a cross tube 211 at least partially between the front-row seats 251 and the cargo box 252. The direction change device 28 for the driver's seat 2511 can be seen, and another direction change device is symmetrically positioned for the passenger's seat 2512 on the opposite side of the vehicle 200. The belt retractors (not shown) are mounted on forwardly extending ends of the cross tube 211 directly underneath the direction change devices 28.

It should be noted that the specific embodiments described herein are used to illustrate this application, not to limit the application. According to the embodiments provided in the present application, all other embodiments obtained by those skilled in the art without creative work fall within the scope of the present application.

The invention claimed is:

1. An off-road vehicle, comprising:
a frame, the frame comprising:
two side posts extending upwardly from a bottom of the frame; and
a cross tube extending transversely with two ends, one of the ends connected to each of the side posts;
a roll-over protection structure arranged above the frame and fixedly connected to the two side posts of the frame, the frame and the roll-over protection structure cooperatively defining a cockpit area for accommodating a driver and one or more passengers;
a suspension connected to the frame;
wheels connected to the frame by the suspension;
a payload area comprising a plurality of front-row seats and one or a plurality of rear-row seats or comprising a plurality of front-row seats and a cargo box, the front-row seats comprising a driver seat and a passenger seat;
a seat belt; and
a belt retractor for retracting the seat belt, the belt retractor being at least partially arranged on the cross tube and connected to the cross tube;
wherein the side posts are positioned at left and right sides of the cockpit area with the cross tube extending behind the front-row seats at a height lower than a top of the driver seat.

2. The off-road vehicle of claim 1, wherein the roll-over protection structure comprises two extension portions connecting to the side posts, wherein a height of the extension portions is defined as a roll-over protection structure height, a height of the side post is defined as a side post height, and a ratio of the roll-over protection structure height to the side post height is in the range from 0.4 to 0.65.

3. The off-road vehicle of claim 2, wherein a height difference between the cross tube and the bottom of the frame is defined as a cross tube height, and a ratio of the cross tube height to the side post height is in the range from 0.65 to 1.

4. The off-road vehicle of claim 2, wherein each extension portion has a lower end with a first limiting portion includes a U-shape defining a first recess, and wherein the side post has an upper end with a second limiting portion includes a U-shape defining a second recess, and when connected the first limiting portion and the second limiting portion mate together with the first limiting portion extending into the second recess and the second limiting portion extending into the first recess.

5. The off-road vehicle of claim 4, wherein the first limiting portion and the second limiting portion mate to define an air gap at the bottom of each U-shape, the air gap partially separating the extension portion from the side post.

6. The off-road vehicle of claim 1, wherein the frame further comprises a connection flange fixed to the cross tube, and the belt retractor is connected to the cross tube by the connection flange.

7. The off-road vehicle of claim 6, wherein the connection flange allows the height and/or angle of the belt retractor to be adjusted relative to the cross tube.

8. The off-road vehicle of claim 1, wherein the belt retractor defines a mouth facing forwardly and upwardly, wherein the seat belt is spring wound inside the belt retractor and extends outwardly from the mouth.

9. The off-road vehicle of claim 8, further comprising a direction change device for changing the direction of the seat belt.

10. The off-road vehicle of claim 9, wherein the roll-over protection structure comprises a direction change hanger plate, and wherein the direction change device is hung from the direction change hanger plate.

11. The off-road vehicle of claim 1, wherein both the driver seat and the passenger seat are provided with belt retractors.

12. An off-road vehicle comprising:
a frame, the frame comprising:
two side posts extending upwardly from a bottom of the frame; and
a cross tube extending transversely with two ends, one of the ends connected to each of the side posts;
a roll-over protection structure arranged above the frame and fixedly connected to the two side posts of the frame, the roll-over protection structure comprising two extension portions connecting to the side posts, the frame and the roll-over protection structure cooperatively defining a cockpit area for accommodating a driver and one or more passengers, the side posts being positioned at left and right sides of the cockpit area, the two ends of the cross tube being fixedly connected to the side posts at the left and right sides of the cockpit area respectively;
a suspension connected to the frame;
wheels connected to the frame by the suspension;
a payload area comprising front-row seats and either rear-row seating or a cargo box, the front-row seats comprising a driver seat and a passenger seat, the cross tube is positioned behind the front-row seats at a height lower than a top of the front-row seats;
a seat belt;
a belt retractor for retracting the seat belt, the belt retractor being at least partially arranged on the cross tube and connected to the cross tube, a height of the extension portion being defined as a roll-over protection structure height, a height of the side post being defined as a side post height, and a ratio of the roll-over protection structure height to the side post height being in the range from 0.4 to 0.65; and
a connection flange fixedly connected to the cross tube, and the belt retractor being connected to the cross tube by the connection flange.

13. The off-road vehicle of claim 12, wherein a height difference between the cross tube and the bottom of the frame is defined as a cross tube height, and a ratio of the cross tube height to the side post height is in the range from 0.65 to 1.

14. The off-road vehicle of claim 12, wherein each extension portion has a lower end with a first limiting portion includes a U-shape defining a first recess, and wherein the side post has an upper end with a second limiting portion includes a U-shape defining a second recess, and when connected the first limiting portion and the second limiting portion mate together with the first limiting portion extending into the second recess and the second limiting portion extending into the first recess, wherein the first limiting portion and the second limiting portion mate to define an air gap at the bottom of each U-shape, the air gap partially separating the extension portion from the side post.

15. The off-road vehicle of claim 12, wherein the connection flange allows the height and/or angle of the belt retractor to be adjusted relative to the cross tube.

16. The off-road vehicle of claim 15, wherein the connection flange includes a bolt hole and a hook tab, and a bolt and a nut are used to secure the belt retractor to the connection flange.

17. The off-road vehicle of claim 12, wherein the belt retractor defines a mouth facing forwardly and upwardly, wherein the seat belt is spring wound inside the belt retractor and extends outwardly from the mouth, and further comprising a direction change device for changing the direction of the seat belt, wherein the roll-over protection structure comprises a direction change hanger plate, and wherein the direction change device is hung from the direction change hanger plate such that the direction change device can occupy any of a range of positions relative to the direction change hanger plate.

18. An off-road vehicle comprising:
a frame, the frame comprising:
two side posts extending upwardly from a bottom of the frame; and
a cross tube extending transversely with two ends, one of the ends connected to each of the side posts;
a roll-over protection structure arranged above the frame and fixedly connected to the two side posts of the frame, the roll-over protection structure comprising two extension portions connecting to the side posts, the frame and the roll-over protection structure cooperatively defining a cockpit area for accommodating a driver and one or more passengers, the side posts being positioned at left and right sides of the cockpit area, the two ends of the cross tube being fixedly connected to the side posts at the left and right sides of the cockpit area respectively;
a suspension connected to the frame;
wheels connected to the frame by the suspension;
a payload area comprising front-row seats and either rear-row seating or a cargo box, the front-row seats comprising a driver seat and a passenger seat, the cross tube is positioned behind the front-row seats at a height lower than a top of the front-row seats;
a seat belt;
a belt retractor for retracting the seat belt; and
a connection flange fixedly connected to the cross tube, and the belt retractor being connected to the cross tube by the connection flange, wherein the connection flange allows the height and/or angle of the belt retractor to be adjusted relative to the cross tube.

19. The off-road vehicle of claim 18, wherein the connection flange includes a bolt hole and a hook tab, and a bolt and a nut are used to secure the belt retractor to the connection flange.

20. The off-road vehicle of claim 18, wherein the belt retractor defines a mouth facing forwardly and upwardly, wherein the seat belt is spring wound inside the belt retractor and extends outwardly from the mouth, and further comprising a direction change device for changing the direction of the seat belt, wherein the roll-over protection structure comprises a direction change hanger plate, and wherein the direction change device is hung from the direction change hanger plate such that the direction change device can occupy any of a range of positions relative to the direction change hanger plate.

* * * * *